US010032450B2

(12) United States Patent
Olmstead et al.

(10) Patent No.: US 10,032,450 B2
(45) Date of Patent: Jul. 24, 2018

(54) SYSTEM AND METHOD FOR ELECTRONIC COMMUNICATIONS

(71) Applicant: ROYAL BANK OF CANADA, Montreal (CA)

(72) Inventors: Gregory Andrew Olmstead, Toronto (CA); Burcu Kilic, Toronto (CA); David Yum Kei Leung, Toronto (CA); Amit Sharma, Toronto (CA); Yehui Zhang, Toronto (CA)

(73) Assignee: ROYAL BANK OF CANADA, Montreal, Quebec (CA)

( * ) Notice: Subject to any disclaimer, the term of this patent is extended or adjusted under 35 U.S.C. 154(b) by 0 days.

(21) Appl. No.: 15/481,721

(22) Filed: Apr. 7, 2017

(65) Prior Publication Data

US 2018/0082678 A1    Mar. 22, 2018

Related U.S. Application Data

(60) Provisional application No. 62/398,060, filed on Sep. 22, 2016.

(51) Int. Cl.
*G06F 17/21* (2006.01)
*G06F 17/27* (2006.01)
(Continued)

(52) U.S. Cl.
CPC .......... *G10L 15/1815* (2013.01); *G10L 15/22* (2013.01); *G10L 15/25* (2013.01); *G10L 15/30* (2013.01); *G10L 17/10* (2013.01); *G10L 17/12* (2013.01); *G10L 17/18* (2013.01); *G10L 25/30* (2013.01); *G10L 25/63* (2013.01); *G10L 25/72* (2013.01); *G10L 2025/786* (2013.01)

(58) Field of Classification Search
CPC ............... G10L 15/22; G10L 2015/228; G06F 17/2785; G06F 17/28; G06F 17/2735; G06F 17/277; G06F 17/2755; G06F 17/30734; G06F 17/2705; G06F 17/30616; G06F 17/21; G06F 17/218; G06F 17/30654; G06F 17/30976; G06F 17/2881; G06F 17/30684; G06F 17/30696; G06N 99/005; G06N 5/025
USPC .............................................. 704/9, 10, 275
See application file for complete search history.

(56) References Cited

U.S. PATENT DOCUMENTS 8,738,534 B2 * 5/2014 Clemencon ............. G06N 5/02
705/55
8,886,587 B1 * 11/2014 Hainsworth ........... G06N 5/025
706/46

(Continued)

*Primary Examiner* — Edgar Guerra-Erazo
(74) *Attorney, Agent, or Firm* — Norton Rose Fulbright Canada LLP; Maya Medeiros

(57) ABSTRACT

In accordance with an aspect, there is provided a system and method for electronic communications that involves machine learning and natural language processing for contact relationship discovery, ranking and retrieval. In accordance with an aspect, there is provided a system and device that discovers contacts related to user search terms, quantitatively measures and ranks the strength between contact relationships according to a score calculated by natural language processing and machine learning. The system generates visual effects to present recommendations to the user with multiple alternate route options to establish relationships between contacts.

20 Claims, 8 Drawing Sheets

(51) Int. Cl.
*G10L 21/00*     (2013.01)
*G10L 15/18*     (2013.01)
*G10L 17/10*     (2013.01)
*G10L 15/22*     (2006.01)
*G10L 15/30*     (2013.01)
*G10L 15/25*     (2013.01)
*G10L 17/12*     (2013.01)
*G10L 17/18*     (2013.01)
*G10L 25/30*     (2013.01)
*G10L 25/63*     (2013.01)
*G10L 25/72*     (2013.01)
*G10L 25/78*     (2013.01)

(56) References Cited

U.S. PATENT DOCUMENTS

| | | | |
|---|---|---|---|
| 9,235,805 B2* | 1/2016 | Clemencon | G06N 5/02 |
| 2012/0059790 A1* | 3/2012 | Clemencon | G06N 5/02 |
| | | | 706/55 |
| 2012/0296966 A1* | 11/2012 | Zhu | G06Q 30/0201 |
| | | | 709/204 |
| 2013/0173520 A1* | 7/2013 | Clemencon | G06N 5/02 |
| | | | 706/46 |
| 2015/0227611 A1* | 8/2015 | Bao | G06F 17/30705 |
| | | | 707/737 |
| 2015/0242406 A1* | 8/2015 | Singh | G06Q 50/01 |
| | | | 707/610 |
| 2017/0034305 A1* | 2/2017 | Blevins | H04L 67/42 |

* cited by examiner

SYSTEM AND METHOD FOR ELECTRONIC COMMUNICATIONS

FIELD

The improvements generally relate to the field of electronic communication and machine learning.

INTRODUCTION

Individuals communicate using electronic communications. Example electronic communications include e-mail messages, instant messages, Short Message Service messages, application messages, social media messages, and so on. Electronic communication content can provide insight into the nature of the relationship of the sender and receiver.

Machine learning is a field of computer science and artificial intelligence that gives computers the ability to generate code without being explicitly programmed. Machine learning is a data analysis technique that automatically builds statistical models by iteratively learning from data. Machine learning uses the statistical models to automatically make predictions on data and decisions.

Natural language processing (NLP) is a field of computer science, artificial intelligence, and computational linguistics that relates to human and computer interactions, natural language understanding. NLP can enable computers to derive meaning from human or natural language input.

SUMMARY

In accordance with an aspect, there is provided a system and method for electronic communications that involves machine learning and natural language processing for contact relationship discovery, ranking and retrieval.

In accordance with an aspect, there is provided a system and device that discovers contacts related to user search terms, quantitatively measures and ranks the strength between contact relationships according to a score calculated by natural language processing and machine learning. The system presents recommendations to the user with multiple alternate route options to establish relationships between contacts.

In accordance with another aspect, there is provided a system for electronic communications comprising a machine learning server and a presentation server. The machine learning server is configured to generate or update a graph structure of nodes and edges in real-time using contact data and communication data. The nodes corresponding to contacts and the edges corresponding to relationship scores computed by natural language processing of the electronic communications between the contacts. That is, an edge connects two nodes that represent contacts, and that edge is associated with a relationship score that represents the strength of relationship between the contacts. The relationship score is calculated by natural language processing of the electronic communications the contacts connecting by the edge. The presentation server is configured to generate visual effects for at least a portion of the graph structure in response to search requests and queries identifying one or more of the contacts.

In some embodiments, the relationship scores are based on a sentiment score and a formality score of the communications between the contacts, the sentiment score and the formality score computed using the natural language processing of the electronic communications between the contacts.

In some embodiments, the relationship scores are based on relationship factors including formality, sentiment, frequency, and timing of the electronic communications.

In some embodiments, informal communications with good sentiment have a higher score than formal communications with bad sentiment.

In some embodiments, the relationship scores represent a strength of relationship between the contacts.

In some embodiments, the presentation server transmits recommendations to an electronic device, the recommendations comprising multiple alternate route options based on connection paths of edges to one or more nodes representing the one or more contacts identified in the queries.

In accordance with another aspect, there is provided a process for electronic communications. The process involves intercepting an electronic communication in real-time between a recipient and a sender. The electronic communication can also refer to or mention other individuals or entities or contacts. For example, social media messages can refer to or mention another contact or entity using @entity or #entity or a plain text reference to the entity. The electronic communication can be used to update relationship scores for the sender, recipient and other individuals or entities referred to in the electronic communication. The process involves classifying the electronic communication using natural language processing to determine a sentiment classification and a formality classification. The process involves calculating a relationship score for the recipient and the sender based (or other entities referred to in the electronic communication) on the classified electronic communication, the sentiment classification and the formality classification. The process involves updating or creating in real-time an edge in a graph structure between nodes representing the recipient and the sender, the update based on the relationship score. The process involves receiving a query identifying a target contact. The process involves identifying a connection pathway within the graph structure to the target contact, the connection pathway including one or more edges and one or more nodes. The process involves generating visual effects for the connection pathway and graph structure for display on a computing device.

In accordance with another aspect, there is provided a process for electronic communications. The process involves receiving a query identifying a target contact. The process involves identifying a connection pathway within a graph structure to the target contact, the connection pathway including one or more edges and one or more nodes, the edges representing relationship scores between contacts based on electronic communications classified in real-time using natural language processing, the relationship scores based on sentiment classifications and formality classifications, the graph structure being updated in real-time. The process involves generating visual effects for the connection pathway and graph structure for display on a computing device.

In accordance with another aspect, there is provided a system for electronic communications. The system has a data storage device storing a graph structure of nodes and edges, the nodes corresponding to contacts and the edges corresponding to relationship scores. The graph structure organizes contact data as a structured set of nodes to indicate connections between contacts. A connection pathway between two nodes indicates a relationship between two corresponding contacts. The connection pathway can indicate a suggested relationship to a target node for a target contact and one or more intermediate nodes. The edges correspond to relationship scores and a preferred connection pathway to a target node can be suggested based on the relationship scores.

The system includes a message routing plug in configured to intercept electronic communications in real-time. The electronic communication having a reference to a contact for at least one of a sender, a recipient and another entity referred to in the electronic communication, the contact corresponding to a node in the graph structure. For example, the contact can be a person or company. The company can be referred to in text data of the message or as a part of a sender or recipient email address, for example.

The system includes a machine learning server configured to process the electronic communication using classification rules to compute a relationship score, the classification rules comprising natural language processing rules for sentiment classification and formality classification, the relationship score indicating strength of a relationship between the contact and another contact. The relationship scores can be used to suggest or recommend one or more intermediate contacts to facilitate a connection to a target contact. For example, person A can have a stronger relationship to the target contact that person B, as indicated by the relationship scores. In that instance, it may be better to use person A to assist with communication with the target contact, such as by way of an introduction. The machine learning server is configured to update the graph structure using the relationship score by updating or creating an edge connected to the node corresponding to the contact in the graph structure based on the relationship score and contact data.

The system includes a presentation server configured to generate visual effects for at least a portion of the graph structure in response to search requests and queries identifying the contact.

In some embodiments, the presentation server receives a query identifying a target contact corresponding to a target node within the graph structure, computes a connection pathway within the graph structure to the target node, the connection pathway including one or more edges and one or more additional nodes; and generates visual effects for the connection pathway and graph structure for display on a computing device. The connection pathway indicates one or more intermediate nodes with an edge to the target node as a suggested method of establishing contact with the target contract, for example.

In some embodiments, the visual effects for the connection pathway indicate an intermediate contact of an intermediate node having an edge to the target node.

In some embodiments, the presentation server transmits recommendations to an electronic device, the recommendations comprising multiple alternate route options based on connection paths of edges to one or more nodes representing one or more contacts identified in a query. The route options are computed based on the relationship scores and are compared to generate a preferred route option with the stronger relationships.

In some embodiments, the relationship score is based on a sentiment score, the natural language processing rules for sentiment classification to determine a positive sentiment, neutral sentiment and negative sentiment from text data of the electronic communication.

In some embodiments, the relationship score is based on a formality score, the natural language processing rules for formality classification to determine an informal tone and formal tone from text data of the electronic communication.

In some embodiments, the relationship score is based on a frequency score as a function of a weighted average of a frequency of electronic communication messages with reference to the contact.

In some embodiments, the relationship score is based on a timing score as a function of a timing data for electronic communication messages with reference to the contact.

In some embodiments, an informal tone with good sentiment indicates a stronger relationship than formal tone with bad sentiment.

In some embodiments, the relationship scores is computed based on sentiment, formality, frequency and timing of the electronic communication.

In some embodiments, the presentation server generates the nodes by processing contact data and generates the edges by processing electronic communications referring to the contacts to compute the relationship scores between the contacts.

In some embodiments, the visual effects for at least a portion of the graph structure are dynamically generated in response to search requests and queries identifying the contacts to indicate the strength of connection between contacts based on the relationship score.

In some embodiments, the visual effects for at least a portion of the graph structure are dynamically generated based on the multiple alternate route options based on connection paths of edges to one or more nodes representing the one or more contacts identified in the queries. The route options generated by comparing and aggregating relationship scores to suggest a preferred route option corresponding to a strong relationship to the target contact.

In some embodiments, the presentation server is configured to generate visual effects for the edge updated or created by the relationship score and the node corresponding to the contact.

In another aspect, there is provided a system for electronic communications having a machine learning server, a presentation server, and a data storage device. The machine learning server configured to intercept electronic communication messages, process the electronic communication messages using natural language processing rules for sentiment and formality classification, and generate or update a graph structure of nodes and edges in real-time using contact data and the processed electronic communication messages. The nodes corresponding to contacts and the edges corresponding to relationship scores computed by the processed electronic communications. The relationship scores indicating strength in relationships between the contacts. The presentation server configured to generate visual effects for connection pathways between a set of nodes of at least a portion of the graph structure in response to search requests and queries identifying one or more of the contacts. The data storage device storing data for the graph structure of the nodes and the edges.

In some embodiments, the relationship scores are based on one or more of formality, sentiment, frequency, and timing of the electronic communication messages between the contacts. In some embodiments, informal communications with good sentiment indicate a stronger relationship than formal communications with bad sentiment.

In some embodiments, the presentation server transmits recommendations to an electronic device, the recommendations comprising multiple alternate route options based on connection paths of edges to one or more nodes representing the one or more contacts identified in the queries, the route options determined by aggregated one or more relationship scores.

In some embodiments, the visual effects for at least a portion of the graph structure are dynamically generated based on the multiple alternate route options based on connection paths of edges to one or more nodes representing the one or more contacts identified in the queries.

In another aspect, there is provided a process for electronic communications comprising: intercepting a plurality of electronic communications in real-time between a recipient and a sender; classifying the electronic communications using natural language processing to determine a sentiment classification and a formality classification; calculating a relationship score for the recipient and the sender (or other entities referred to in the electronic communication) based on the sentiment classification and the formality classification; updating or creating in real-time an edge in a graph structure between nodes representing the recipient and the sender, the update based on the relationship score; receiving a query identifying a target contact; identifying a connection pathway within the graph structure to the target contact, the connection pathway including one or more edges and one or more nodes; and generating visual effects for the connection pathway and graph structure for display on a computing device, the connection pathway including one or more intermediate contacts linked to the target contact.

In another aspect, there is provided a process for electronic communications comprising: receiving a query identifying a target contact; identifying a connection pathway within a graph structure to the target contact, the connection pathway including one or more edges and one or more nodes, the edges representing relationship scores between contacts computed by processing electronic communications using natural language processing rules, the relationship scores based on sentiment classifications and formality classifications, the graph structure being updated in real-time based on the relationship scores; and generating visual effects for the connection pathway and graph structure for display on a computing device.

Many further features and combinations thereof concerning embodiments described herein will appear to those skilled in the art following a reading of the instant disclosure.

DESCRIPTION OF THE FIGURES

Embodiments will now be described, by way of example only, with reference to the attached figures, wherein in the figures.

DETAILED DESCRIPTION

Figure 1:
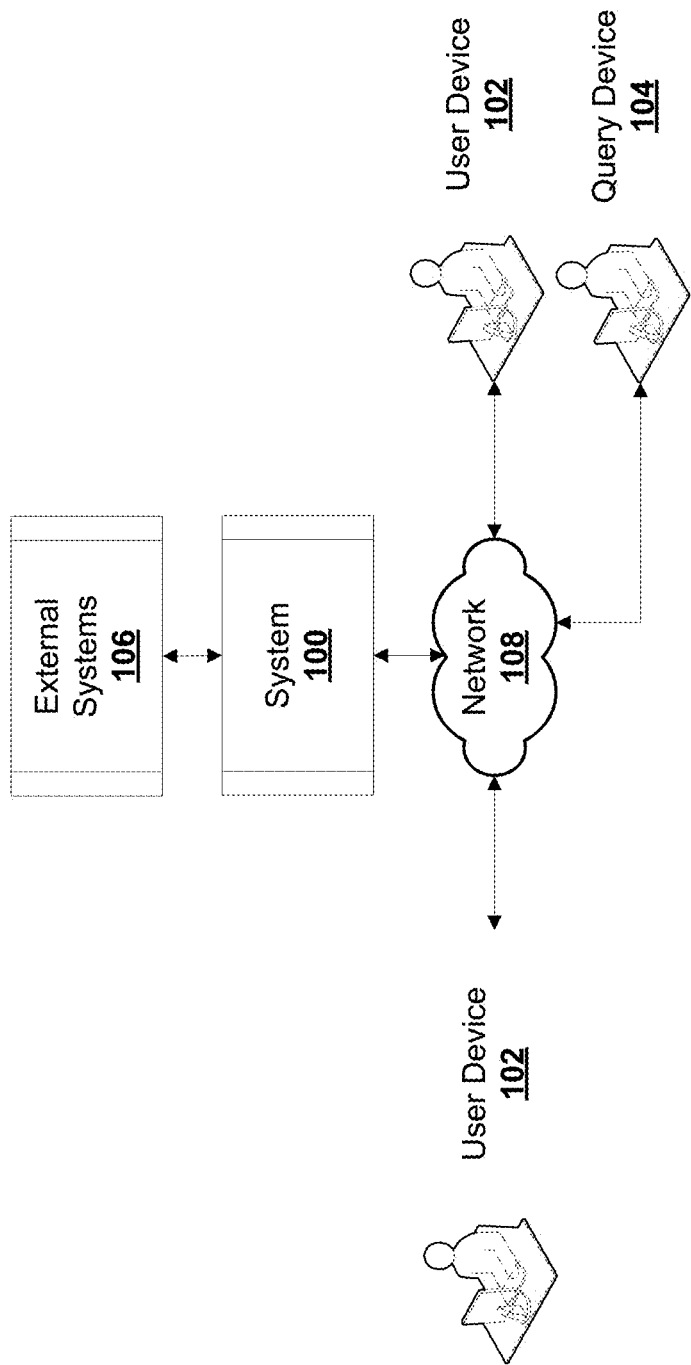
FIG. 1 is a schematic view of a system for electronic communications according to embodiments described herein.

FIG. 1 is a schematic view of a system 100 for electronic communications according to embodiments described herein. Example electronic communications include e-mail messages, instant messages, Short Message Service messages, application messages, social media messages, and so on. Electronic communications can also be based on voice communications (e.g. phone calls, video conferencing, voicemail messages).

The system 100 processes electronic communications using machine learning and natural language processing to discover contacts between individuals and entities referenced in the electronic communications. The system 100 is operable for contact relationship discovery, ranking and retrieval. The system 100 intercepts electronic communications for machine learning and natural language processing in real-time. System 100 is configured for interpreting and parsing voice communications (e.g. phone calls, video conferencing, voicemail messages) to update the relationship score as well.

The system 100 discovers contacts related to user search terms received from query device 104. The system quantitatively measures and ranks the strength between contact relationships according to a score calculated by natural language processing and machine learning techniques. The system presents recommendations to the user with multiple alternate route options to establish relationships between contacts.

User device 102 can exchange electronic communications with other user devices 102. Electronic communications can have a sender, recipients and other participants which may all be referred to as contacts. Additional contacts can be referred to within the content of the electronic communications. Contacts can also refer to individuals or entities that a user of the system 100 would like to establish a connection with. Example entities include companies, organizations, domains, individuals, groups, departments, and so on. The system 100 quantitatively measures and ranks the strength of relationships between contacts according to calculated scores. The system 100 uses natural language processing and machine learning to generate scores representing the strength between contact relationships. The system 100 stores the scores for retrieval in response to search requests. The system 100 discovers contacts related to user search terms received from query device 104. The system 100 presents recommendations to the query device 104 with multiple alternate routes to establish relationships between contacts. The system 100 presents recommendations and predictions using different visual effects.

The system 100 is operable to connect to external systems 106 to receive electronic communications and contact data for processing. A network 108 connects the system 100 to user devices 102 and query devices 104. Network 108 is capable of carrying data. Network 108 can involve wired connections, wireless connections, or a combination thereof. Network 108 may involve different network communication technologies, standards and protocols. Network 108 may involve different physical media such as coaxial cable, fiber optics, transceiver stations and so on. Network 108 can be a local area network or wide area network.

The system 100 has a machine learning server 204 to generate the graph structure of nodes and edges corresponding to contacts and relationship scores according to some embodiments. The system has a presentation server 206 to generate visual effects for parts of the graph structure in response to search requests and queries according to some embodiments.

The system 100 can have the ability to remove nodes and edges, such as contacts that opt-out of the system 100 or contacts that are no longer available, employed by an organization or deceased persons. In some embodiments, contacts can opt-out from the system 100. This allows users to opt-out of being part of the graph structure or redact, temporarily or non-destructively hide particular relationship links, while still being part of the system 100 overall. In some embodiments, the system may allow contacts to exclude specific communication instances from being tracked by the system 100, without requiring the contact to fully opt-out. Accordingly, a contact can opt out from the graph of the system 100 or exclude particularly communications from being processed by the system 100.

Figure 2:
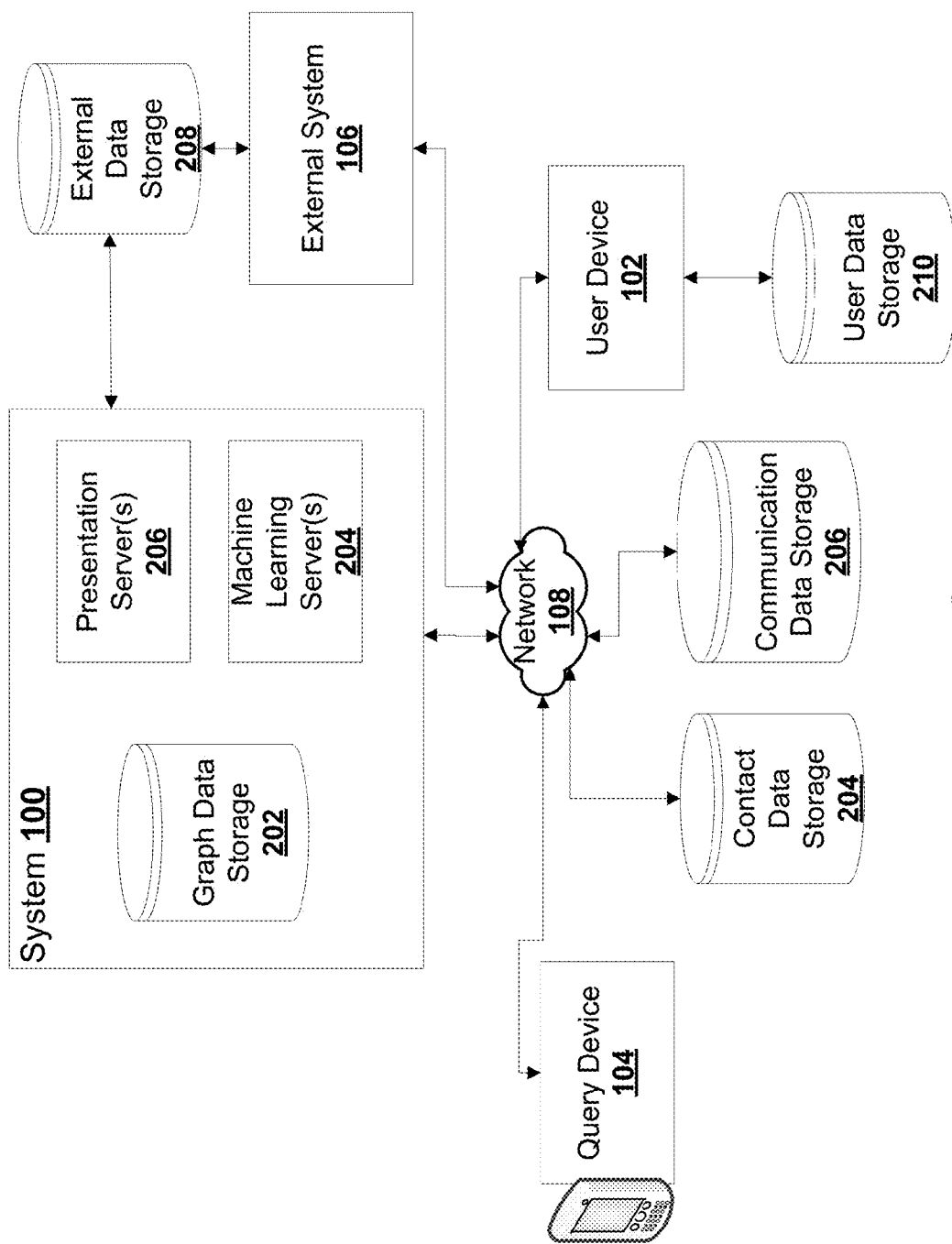
FIG. 2 is a schematic view of a system for electronic communications according to embodiments described herein.

FIG. 2 is a schematic view of a system 100 for electronic communications according to embodiments described herein.

The system 100 monitors electronic communications between individuals and entities (referred to as contacts) to attempt to quantify the strength of the relationship between them using a relationship score. The system 100 can connect to external system 106 to intercept or receive electronic communications or data relating to contacts. External data storage 208 can persistently store data related to electronic communications or contacts for external system 106.

The system 100 configures a machine learning server 204 to implement natural language processing rules to determine whether electronic communications, such as emails, are written in a formal or informal manner, or in a positive or negative manner. The machine learning server 204 uses different relationship factors to generate or update scores for relationships between contacts. Example relationship factors include formality, tone, frequency, and timing of electronic communications. Real-time and historical electronic communications can be used. Each electronic communication between those contacts or individuals may be processed by machine learning server 204 to update the score. The machine learning server 204 can stored the relationship scores and data related thereto (including some or all electronic communications) in graph data storage 202. The graph data storage 202 can be a distributed graph storage servers, for example. Contact data storage 204 persistently stores data related to contacts, such as individuals and entities, for example, including metadata and attributes about contacts, such as company, title, phone, address, electronic address, and so on. Communication data storage persistently stores 206 data related to electronic communications.

Query device 104 queries system 100 with search requests for connections to various contacts (e.g. individuals, entities). The system 100 configures a presentation server 206 to interact with machine learning server 204 to respond to search requests. Presentation server 206 queries the database of relationship scores in graph data storage 202 to determine what connection paths exist between contacts and the strength of those connections. Presentation server 206 generates visual representations of contacts, what connection paths exist between contacts and the strength of those connections using different visual effects. For example, nodes of a graph can visually represent contacts and edges between the nodes can represent a connection path between contacts. The edges can be assigned values or weights to represent different scores. The edges and scores are iteratively updated as new electronic communications are processed by machine learning server 204.

As a use case example, query device 104 can use the system 100 to find the best person for an introduction to a particular person you would like to be connected with. This would be useful for building business relationships, facilitating introductions within or across enterprises, checking references, cross-selling, or internal recruiting.

The system 100 can implement a feedback mechanism to allow one or both parties to approve or modify the computed relationship score. The system 100 indicates a score on query device 104 or user device 102 and receives feedback response confirmations in response. The system 100 can train machine learning servers 204 based on the response confirmations.

The machine learning server 204 uses different relationship factors to determine the scores. For example, when determining the relationship score, the machine learning server 204 processes the electronic communication to identify and detect different relationship factors. Example relationship factors include keywords, emojis, and message tone. This is not an exhaustive list and other relationship factors can be used. The frequency of communications may also be a factor, and any historical communications may also be scraped when registering with the system 100. The historical communications may be used to update the score or train the machine learning server 204.

When querying for the strongest relationships to a target contact, the system by default may display up to a number (e.g. three) of best connection paths between a user and the target contact. If the user does not have any strong relationship paths, or even if they do, the system 100 may also recommend internal people who the user should connect with who do have strong relationship paths with the target contact. The paths may be ranked by the total average relationship strength between all hops, or ranked by the strength of the first hop, or final hop, or by other ranking process.

The system 100 uses relationship factors to establish a score from formality and sentiment to rank the relationship strength between contacts (e.g. entities, individuals). The system 100 uses NLP techniques to derive scores based on formality and sentiment scores, for example. The system 100 process electronic communications in real-time to determine and rank the strength between individuals using the scores. For example, informal communications with good sentiment can rank higher than formal communications with bad sentiment.

The system 100 generates a graphic representation of a network of connected people, and the edge between nodes only contains the accumulated total score calculated in real-time.

Machine learning server 204 uses NLP and scoring to rank and quantify relationships based on electronic communications. Machine learning server 204 implements a training mode to generate a classifier. Machine learning servers 204 can train using different learning methods and manual tagging, for example. An example supervised learning method is the multinomial Naive Bayes or multinomial NB model, a probabilistic learning method. The Naive Bayes can be used to determine sentiment to initially train on a dictionary of words and data sets to generate a classifier (tone, formality) to classify electronic communications. When in training mode, machine learning server 204 can use a set of electronic communications (100 s) that have been manually classified by tone, formality, and other relationship factors. Machine learning server 204 processes electronic communications to generate a score from 0 to 1 in relation to tone, formality, and other factors, by way of example. Other score values can be used.

Machine learning server 204 processes electronic communications in real-time to update scores. Machine learning server 204 can update scores using different smoothing techniques for gradual impact. Machine learning server 204 can update scores using weighted averages based on the frequency of communication. For example, if there are ten messages with a high score then one message with a low score should not have a large impact on the score rather gradual impact. Other example relationship factors for the score other include frequency of emails, reply to emails (communication characteristics), historical communications (tone, formality, frequency). This is not an exhaustive list of relationship factors.

Machine learning server 204 implements a feedback mechanism that can be direct or indirect to refine the NLP of electronic communications and score calculation. For example, query device 104 can indicate a recommendation for a contact was useful and a good match or connection using a response confirmation (e.g. direct feedback). As another example, machine learning server 204 can automatically notice an increase in communication between two contacts after a recommendation and assume that the recommendation for the contact was successful (e.g. derived feedback).

Presentation server 206 generates visual effects to show connection paths between contacts. In some embodiments, as messages are received presentation server 206 builds a graph structure. In some embodiments, presentation server 206 builds the (sub)graph structure at query time rather than at message received time. However the overall graph can be updated as messages are received by Machine Learning Server 204. Each node is a contact and the edges represent the computed scores for relationships between contacts.

Presentation server 206 responds to queries by traversing the graph structure to find the shortest path with the lowest cost. The cost may have an inverse relationship to the relationship score in some embodiments (e.g. strongest relationship which may be reflected by the highest relationship score). Presentation server 206 can use different path calculation and graph traversal techniques. An illustrative example is Dijkstra's algorithm but any suitable graph traversal algorithm that considers the cost of connections can be used. You do not want a bad connection between contacts for a recommendation. Presentation server 206 filters contacts and connection paths based on user configurations. For example, presentation server 206 can limit recommended connections paths by two hops and less.

The system 100 processes electronic communication messages in real-time to update the score. The system 100 adjusts edges of the graph structure incrementally in real-time using different weighted techniques, such as a function of a weighted average of the frequency of electronic communication messages. The system 100 is not limited to a static pool of data that require a complete reprocessing of data for any incremental changes.

The system 100 processes different types of electronic communication that refer to contacts such as a sender and a receiver or subject or reference to someone (e.g. hashtag, user name, handle).

Figure 3:
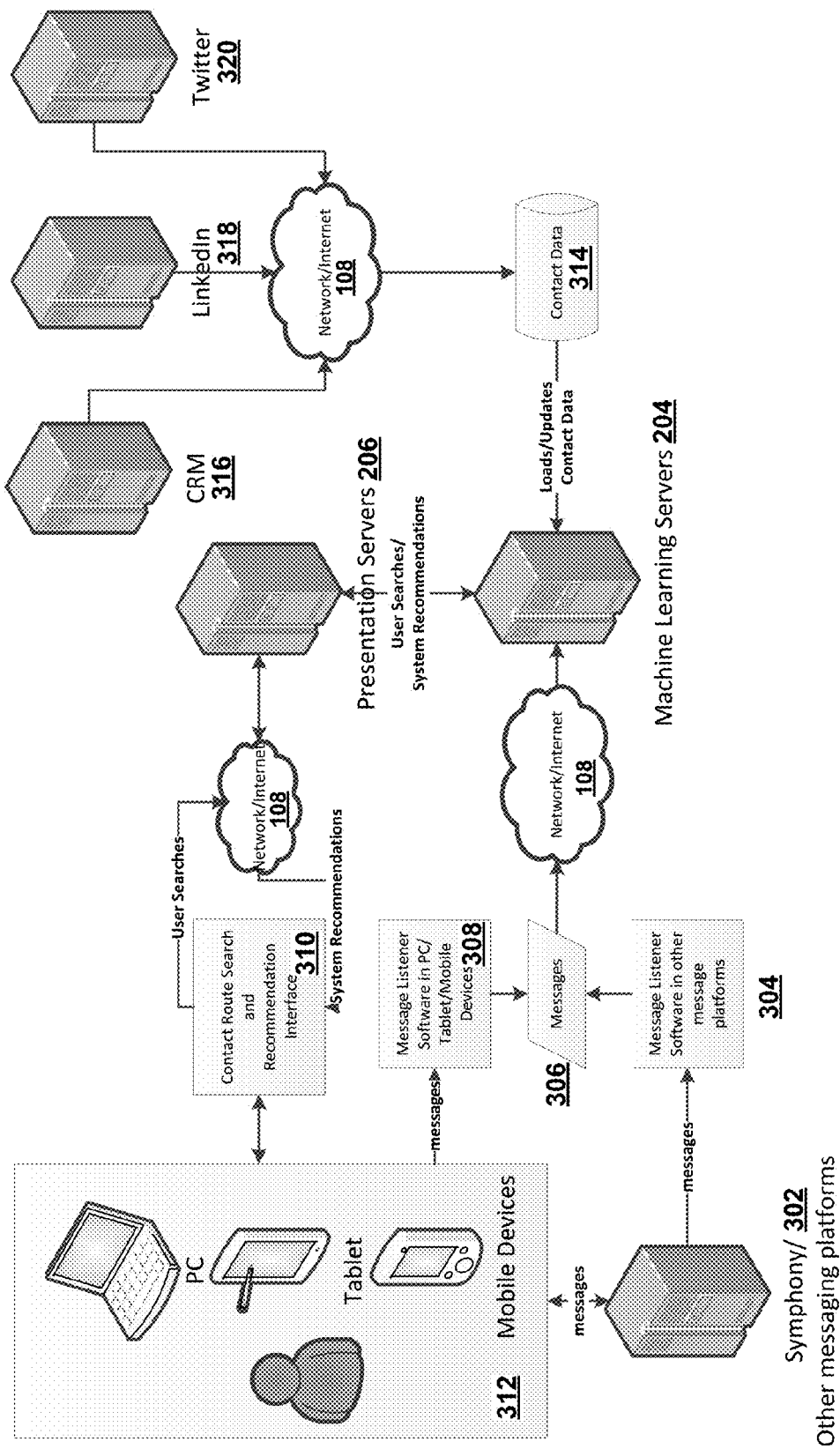
FIG. 3 is a schematic view of another system for electronic communications according to embodiments described herein.

FIG. 3 is a schematic view of components of a system for electronic communications according to embodiments described herein. Machine learning server 204 receives messages 306 over network 108 from message listener software 308 installed on electronic devices 312 or message listener software 304 installed on messaging platforms 302. Message listener software 304, 308 intercepts communication messages for real-time processing. Machine learning server 204 receives contact data 314 to identify contacts within messages 306 to compute scores using NLP. The contact data 314 can be populated using the electronic communications (sender, recipients, email addresses, domains), third party data from CRM platforms 316 and social network platforms 318, 320. Machine learning server 204 is configured with a modular interface to connect to different data sources to receive contact data 314 and messages 306. Machine learning server 204 generates and updates a graph structure using the contact data 314 and scores generated by processing the messages 306. Machine learning server 204 stores data relating to the graph structure, scores and contacts in data storage, such as a distributed graph storage structure or cluster.

Presentation server 206 receives search requests and queries from electronic devices 312 by way of a contact route search and recommendation interface 310. The contact route search and recommendation interface 310 can receive user configurations for queries and visual representations derived in response to the queries. Presentation server 206 interacts with machine learning server 204 to generate graphs or sub-graph structures representing user searches or system recommendations. The contact route search and recommendation interface 310 displays visual effects based on graphical representations of contacts and relationships generated by presentation server 206. The search request or query may be directed to a target contact or a target group. Presentation server 206 can generate different scopes of results for recommendations, such as contact to contact or group to group.

Presentation server 206 is operable to log data relating to query requests including data identifying the query device 104, the time of the query, the target contact or entity, results of the query, user configurations, and so on. Presentation server 206 is operable to transmit data used to generate the visual effects and graphical representation of the query results to trigger the display of data on the query device 104 or another user device 102.

Machine learning server 204 implements a modular interface to receive contact data 314 from different data sources. Machine learning server 204 connects to CRM server 316 and can also connect to other data sources to receive files to generate a list of contacts, such as tables or spreadsheets of contact data. Machine learning server 204 can pull in different types of data to build up or enhance contact data 314. Machine learning server 204 can generate a data record for a contact (name, title, communication address) to provide additional results or update scoring. Machine learning server 204 can generate, filter and enrich the contact data 314 in different ways based on the different data types and sources. Machine learning server 204 generates and stores all score related data.

Machine learning server 204 can process different types of electronic communications or messages 306, such as email, instant, and social media messages. Machine learning server 204 can aggregate and merge different types of messages for NLP to generate relationship scores. The different types of messages may be processed the same or may have different processing and weighting depending on the type of message.

Machine learning server 204 maintains a listing of contact data and associates a unique identifier with each contact entry to avoid duplications. The unique identifier can be a key to different identifiers for contacts, such as email address, username, CRM identifier, and so on. The unique identifier is unique for each contact at a system level or global level, for example. The unique identifier can be one or more identification fields for a respective contact.

Machine learning server 204 generates, updates and stores the graph structure data including the nodes and edges. The nodes correspond to contacts. Machine learning server 204 can maintain a unique identifier or key for each contact and node. Machine learning server 204 can store contact data as contact entries. Each contact entry can include the unique identifier and other attributes for the contact. Machine learning server 204 can generate new nodes in response to receiving new contact data 314 or new messages 306. Machine learning server 204 generates or updates edges in response to calculating new relationship scores based on intercepted messages 306. In some embodiments, presentation server 206 implements graph traversal processes in response to queries. Presentation server 20 identifies the recommended path connections and data relating to the graph structure to generate the visual effects. In some embodiments, machine learning server 204 implements graph traversal processes in response to queries from presentation server 206 to recommend path connections to target contacts. Machine learning server 204 provides the recommended path connections and data relating to the graph structure to presentation server 20 to generate the visual effects.

Figure 4:
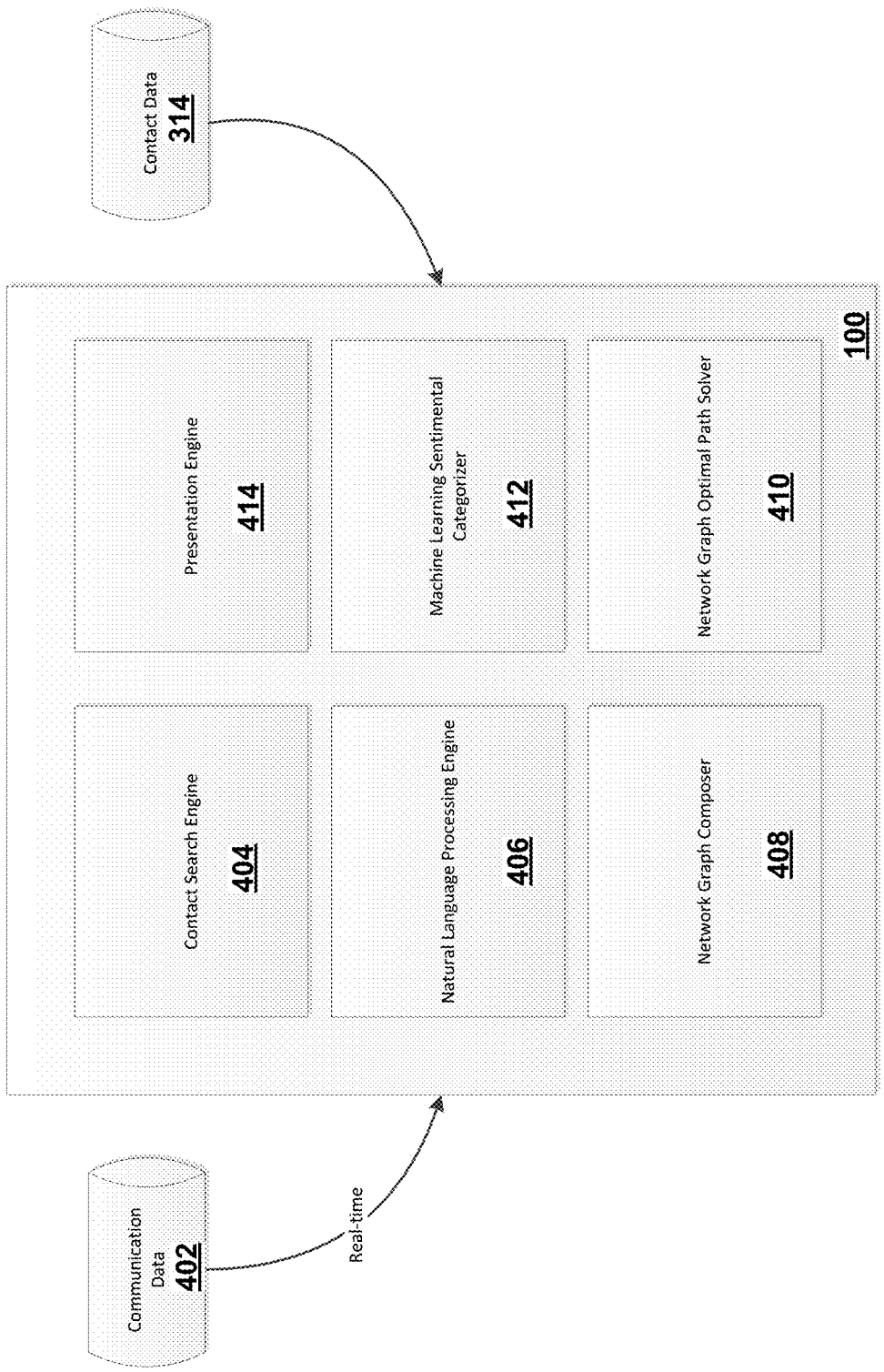
FIG. 4 is a schematic view of components of a system for electronic communications according to embodiments described herein.

FIG. 4 is a schematic view of components of a system 100 for electronic communications according to embodiments described herein. The system 100 processes communication data 402 in real-time to generate or update scores for relationships between contacts. The system 100 receives contact data 314 to define contacts as nodes in a graph structure. The system 100 updates the graph structure in real-time with edges representing the computed scores. The system 100 includes a contact search engine 404, a natural language processing engine 406, a network graph composer 408, a presentation engine 414, a machine learning sentimental categorizer 412, and a network graph optimal path solver 410.

The contact search engine 404 and the presentation engine 414 implement aspects of presentation server 206 according to some embodiments. The contact search engine 404 generates an interface for receiving search requests or queries from query device 104. The presentation engine 414 generates different visual effects and graphical representations of the nodes and edges based on results of the search requests or queries. The presentation engine 414 triggers the display of the different visual effects and graphical representations on the interface in response to the search requests or queries.

The contact search engine 404 can receive queries for specific contacts or a group affiliated with multiple contacts. For example, a query can be directed to person A. As another example, a query can be directed to target organization B and requests a recommendation for connecting to any person that is part of target organization B. The target organization can be used to define a domain or sub graph of contacts that can be identified based on their email address domain, for example. An email address domain can uniquely identify the target organization. The contact search engine 404 interacts with the network graph optimal path solver 410 to generate a sub graph that filters the contact data based on the target organization. The network graph optimal path solver 410 can also generate a new graph structure with nodes corresponding to a subset of the contact data based on the target organization. The resulting graph or sub graph is provided to the presentation engine 414 to generate the visual effects for display to the user. The visual effects can be a graphical representation of the nodes and edges for the target organization or a listing of contacts that have connection paths to one or more contacts that are part of the target organization.

The natural language processing engine 406, network graph composer 408, the machine learning sentimental categorizer 412, and the network graph optimal path solver 410 implement aspects of the machine learning server 204 according to some embodiments. The natural language processing engine 406 receives electronic communications (from communication data 402) in real-time and is configured with a natural language parser to process the electronic communications. Parsing or syntactic analysis is the process of analysing a string of symbols (e.g. natural language or computer language) conforming to the rules of a formal grammar. The natural language parser includes program instructions and the formal grammar to identify grammatical structure of sentences and groups of words that form phrases. The natural language parser determines words that are the subject or object of a verb. For example, probabilistic parsers use knowledge of language gained from parsed sentences to try to predict a likely analysis of new sentences. The machine learning sentimental categorizer 412 generates a score for the parsed communication languages by classifying the tone or sentiment and the formality, among other relationship factors. The network graph composer 408 generates or updates edges between nodes of a graph structure based on the generated scores. The network graph optimal path solver 410 identifies path connections between nodes to provide recommended contacts in response to queries from the presentation engine 414. The network graph optimal path solver 410 implements different graph traversal processes based on the costs of the edges connecting different nodes as the edges represent relationship scores.

Figure 5:
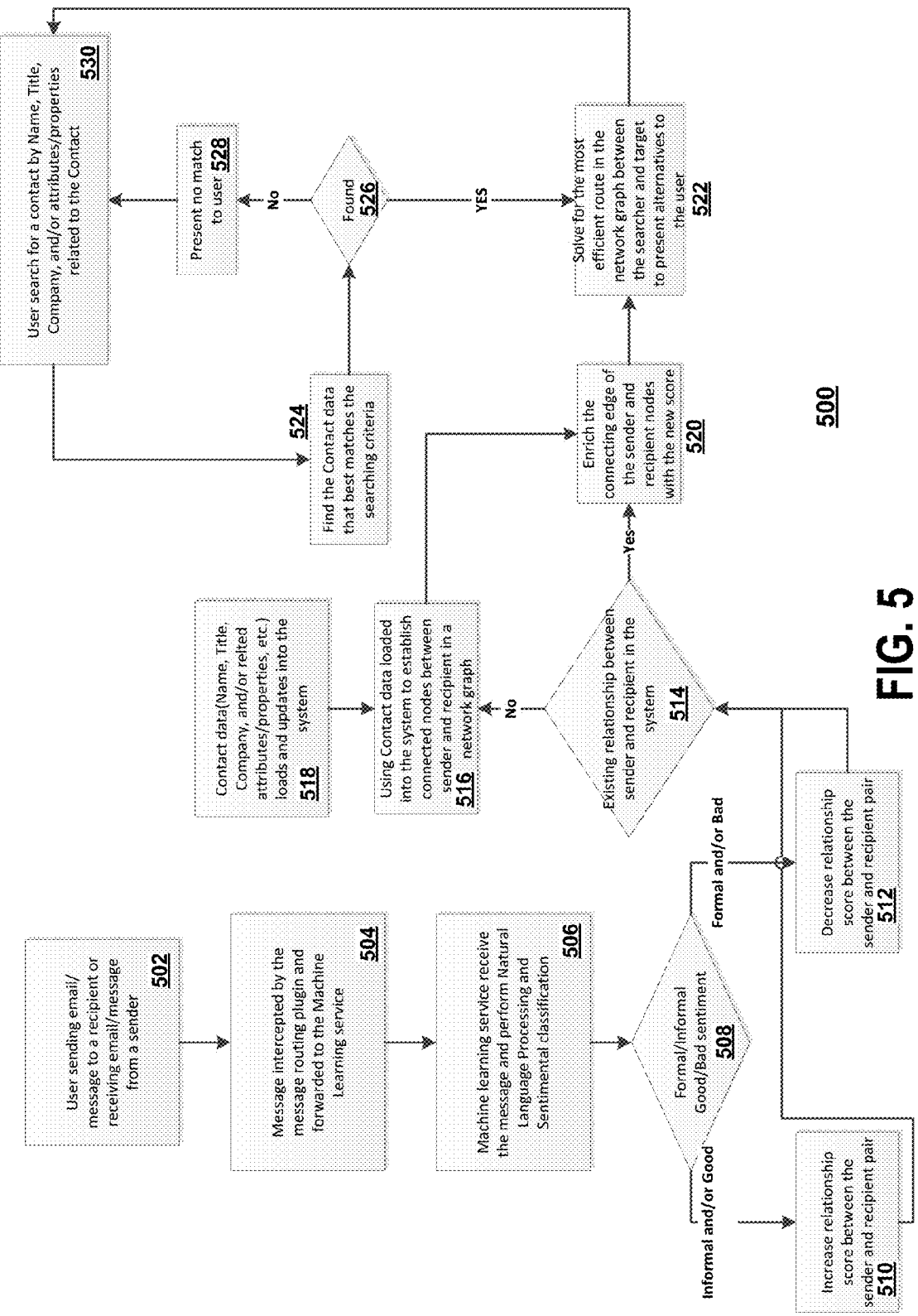
FIG. 5 is a flow chart of a process for electronic communications according to embodiments described herein.

FIG. 5 is a flow chart of a process for electronic communications according to embodiments described herein.

At 502, electronic communication is generated or transmitted. For example, user device 102 can send an electronic communication to a recipient or user devices 102 receives an electronic communication from a sender. As another example, user device 102 can generate an electronic communication that refers to one or more contacts, such as a social media message that refers to an entity in the body of the message.

At 504, the electronic communication is intercepted by a message routing plugin and forwarded to machine learning server 204. In some embodiments, the system 100 can determine whether the electronic communication is excluded from processing by machine learning server 204 (e.g. at 506), or whether a contact associated with the electronic communication has opted-out of the graph structure updated by machine learning server 204 (e.g. at 510 or 512).

At 506, the machine learning server 204 receives the electronic communication and classifies the electronic communication using NLP and relationship factors to generate or update score(s).

At 508, the machine learning server 204 compares computed relationship factors to different thresholds. For example, the machine learning server 204 classifies the electronic communication as being formal or informal and of good or bad sentiment using threshold values.

At 510, the machine learning server 204 updates the relationship score between contacts (sender and recipient pair or another entity referred to in the electronic communication) to indicate a stronger relationship (e.g. increased strength) between contacts. The update may be an increase to the relationship score. The stronger relationship may be based on an informal classification or good sentiment classification, for example.

At 512, the machine learning server 204 updates the relationship score between contacts (sender and recipient pair) to indicate a weaker relationship between contacts (e.g. increased strength). The update may be to decrease the relationship score. The weaker relationship may be based on a formal classification or bad sentiment classification, for example. In some embodiments, at 510 and 512 the machine learning server 204 can make different adjustments or updates to the relationship score. This is an example use case. In some embodiments, formality can be seen as positive relationship instead of negative relationship in certain use cases.

At 514, the machine learning server 204 determines whether there is an existing relationship between the sender and recipient pair (or other contacts referred to in the electronic communication) stored in the system 100.

If there is not an existing relationship between the sender and recipient pair, then at 516, the machine learning server 204 uses contact data loaded into system 100 to establish an edge connecting the nodes for the sender and recipient pair in a network graph structure. The edge is weighted or otherwise assigned the computed relationship score. At 518, contact data is loaded and updated to system 100 to enrich contact details.

If there is an existing relationship between the sender and recipient pair, at 520, the machine learning server 204 enriches or updates the edge connecting the nodes for the sender and recipient pair in the network graph structure for the new computed score.

At 530, query device 104 provides a search for connections to one or more contacts using attributes related to contact(s). At 524, the system finds the contact data that best matches the searching criteria. At 526, the system 100 determines whether the contact data is found. If not, then at 528, the system 100 indicates to query device 104 that no contact match is found. If the contact data is found and in response to the search request or query, at 522, the presentation server 206 solves for the most efficient route or path in the network graph between the searcher and the target to present alternatives to the user.

Figure 6:
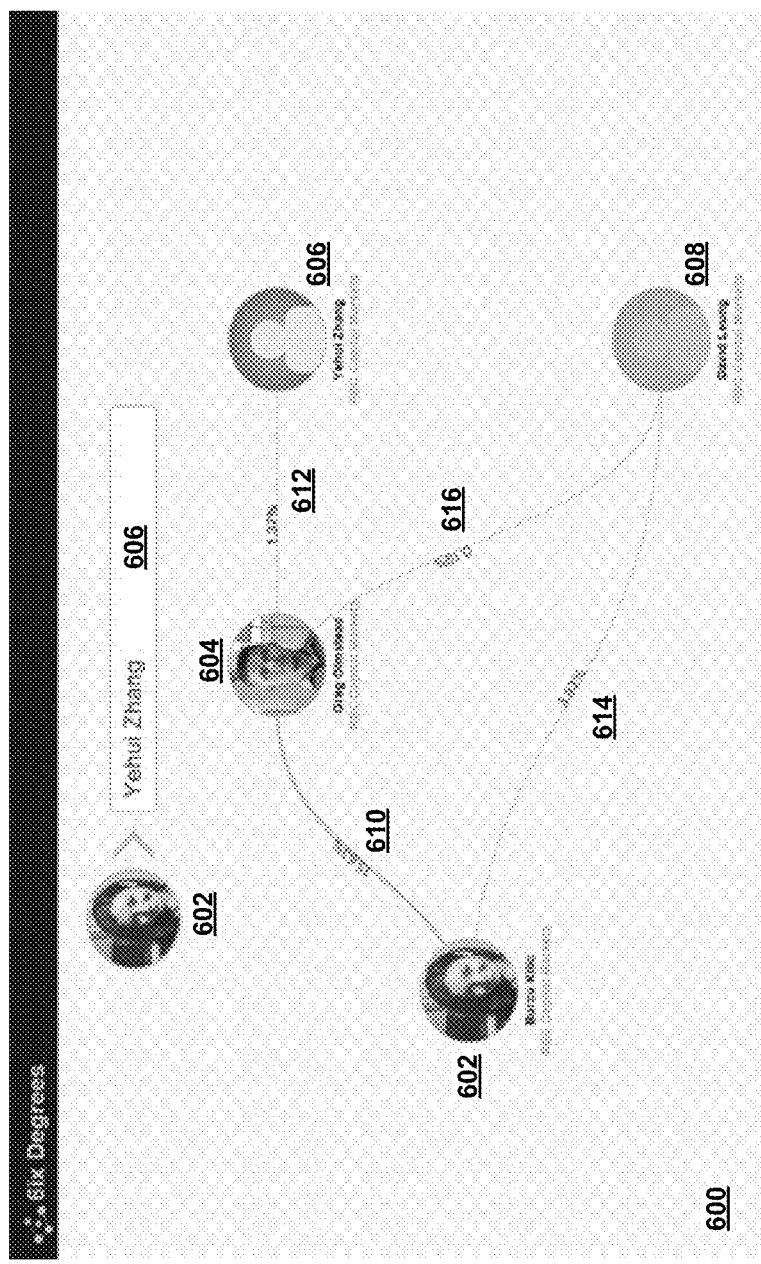
FIGS. 6 and 7 are example visual representations of graphs connecting contacts using edges representing scores.

FIG. 6 is an example visual representation 600 of a graph connecting nodes representing contacts using edges representing scores. The visual representation 600 includes a graph structure with contact nodes 602, 604, 606, 608 connected by edges 610, 612, 614, 616 to define relationship paths. The edges 610, 612, 614, 616 have associated scores. The visual representation 600 includes an indication of a search request for two contacts that correspond to nodes 602, 606 in the graph.

Figure 7:
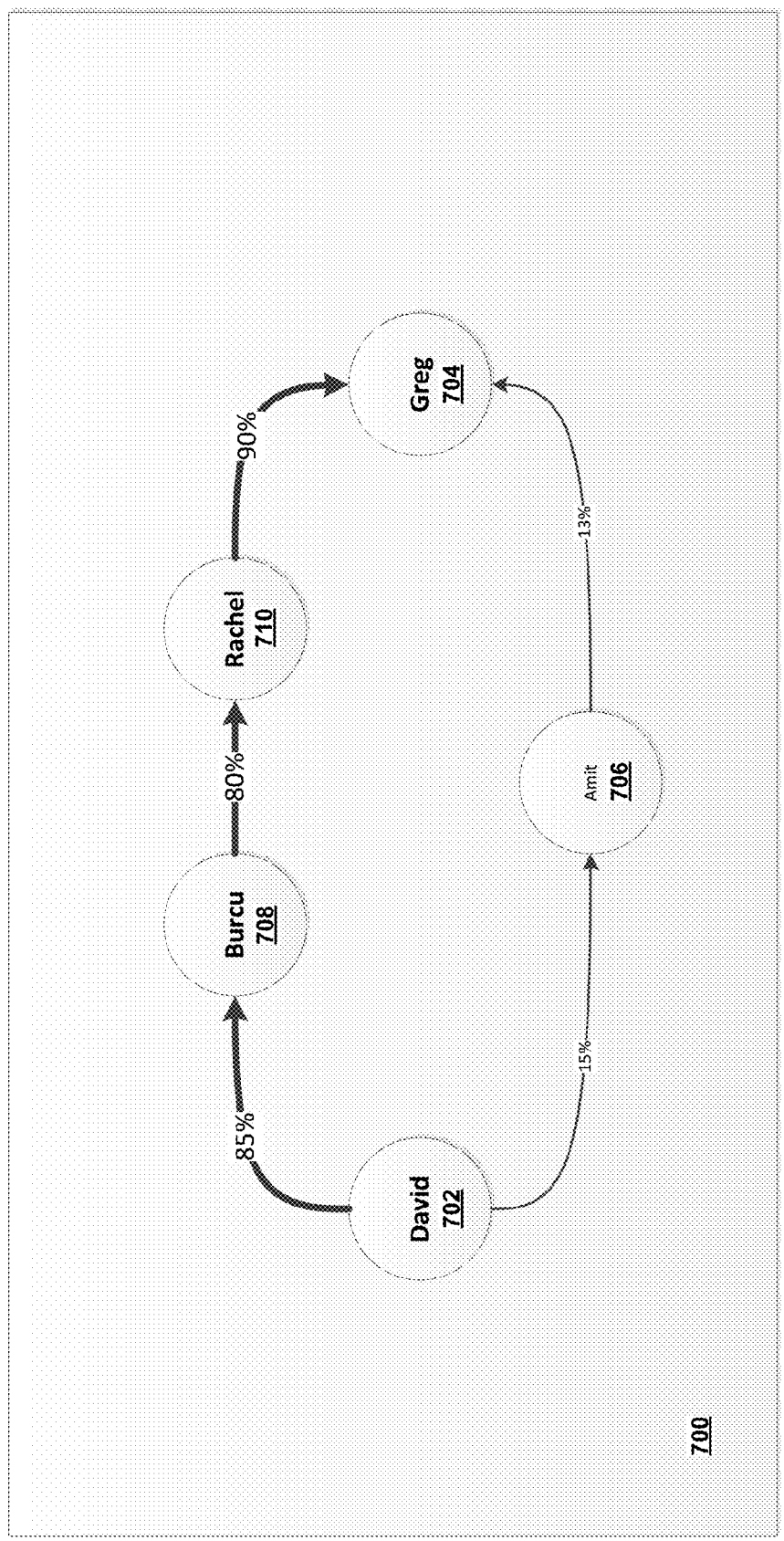

FIG. 7 is another example visual representation 700 of a graph connecting nodes representing contacts using edges representing scores. The visual representation 700 includes a graph structure with contact nodes 702, 704, 706, 708, 710 connected by edges to define relationship paths. The edges have associated scores. The graph representation of the recommended connection route is highlighted. Although the recommended connection route is one more hop, connecting David 702 and Greg 704 through Burcu 708 and Rachel 710 will have a stronger relationship score than through Amit 706.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

Various example embodiments are described herein. Although each embodiment represents a single combination of inventive elements, all possible combinations of the disclosed elements include the inventive subject matter. Thus if one embodiment comprises elements A, B, and C, and a second embodiment comprises elements B and D, then the inventive subject matter is also considered to include other remaining combinations of A, B, C, or D, even if not explicitly disclosed.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information.

Figure 8:
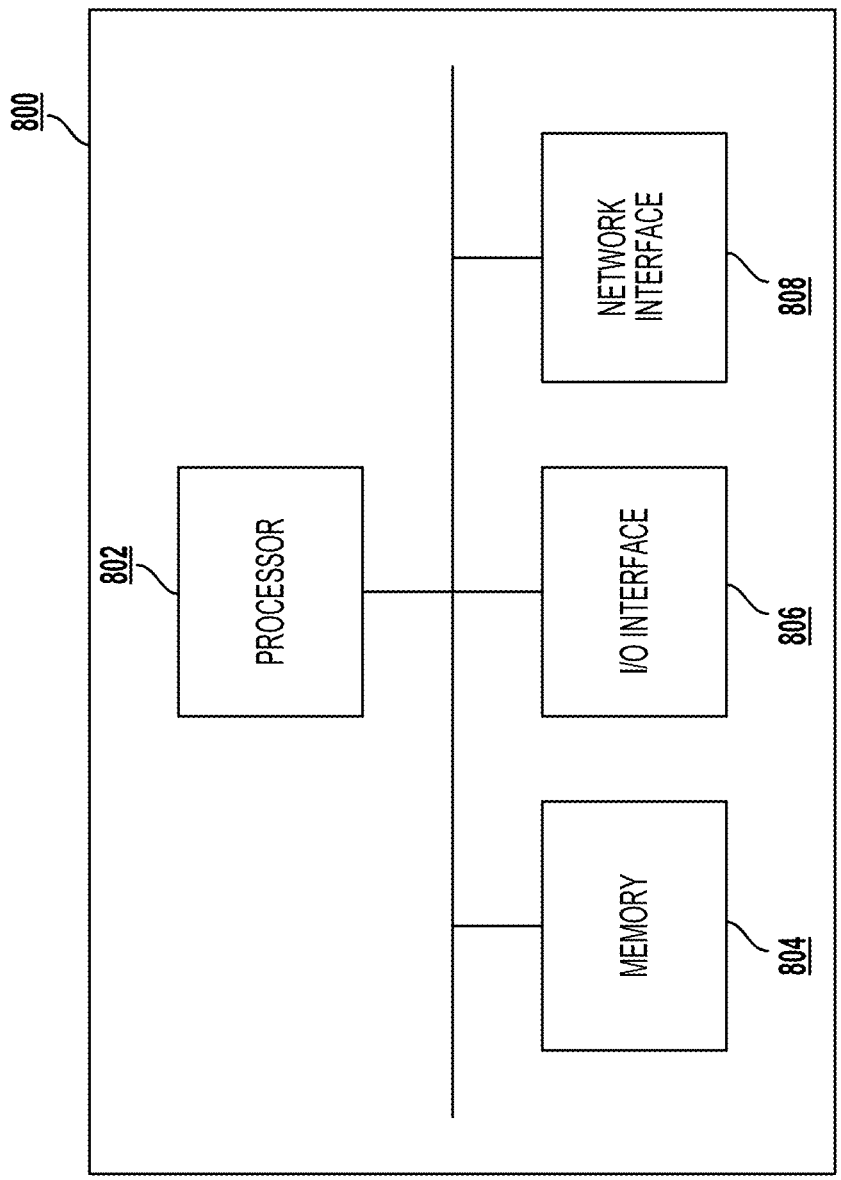
FIG. 8 is a schematic view of a computing device for electronic communications according to embodiments described herein.

FIG. 8 is a schematic view of a computing device 800 for electronic communications according to embodiments described herein. The computing device 800 can represent aspects of system 100, user device 102, query device 104 or a combination thereof. For simplicity only one computing device 800 is shown but system may include more computing devices 800 operable by users to access remote network resources and exchange data and electronic communications. The computing devices 800 may be the same or different types of devices. The computing device 800 at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

Computing device 800 includes at least one processor 802, memory 804, at least one I/O interface 806, and at least one network interface 808.

Each processor 802 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 804 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 806 enables computing device 800 to interconnect with one or more input devices, such as a keyboard, mouse, camera, touch screen and a microphone, or with one or more output devices such as a display screen and a speaker.

Each network interface 808 enables computing device 800 to communicate with other components, to exchange data with other components, to access and connect to network resources, to serve applications, and perform other computing applications by connecting to a network (or multiple networks) capable of carrying data.

Computing device 800 is operable to register and authenticate users (using a login, unique identifier, and password for example) prior to providing access to applications, a local network, network resources, other networks and network security devices. Computing devices 800 may serve one user or multiple users.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A system for generating and updating user interface with machine learning output data relating to electronic communications and contact data, the system comprising:
  a data storage device storing a graph structure of nodes and edges, the nodes corresponding to contacts and the edges corresponding to relationship scores;
  a message routing plug in configured to intercept an electronic communication in real-time, the electronic communication having a reference to a contact for at least one of a sender, a recipient and another entity referred to in the electronic communication, the contact corresponding to a node in the graph structure;
  a machine learning processor configured to:
    process the electronic communication using classification rules to compute a relationship score, the classification rules comprising natural language processing rules for sentiment classification and formality classification, the relationship score indicating strength of a relationship between the contact and another contact;
    update the graph structure using the relationship score by updating or creating an edge connected to the node corresponding to the contact in the graph structure based on the relationship score and contact data;
  a presentation processor configured to process machine interpretable instructions to generate visual effects for at least a portion of the graph structure in response to search requests and queries identifying the contact, the presentation processor further configured to control rendering, on a display at a device, of a user interface including visual interface elements corresponding to the visual effects for the portion of the graph structure generated by the machine learning processor, the visual interface elements indicating contact nodes and relationship edges connecting the contact nodes, the visual effects indicating a contact node representing the node corresponding to the contact in the graph structure, a relationship edge representing the edge connected to the node corresponding to the contact, and an indication of the relationship score;
  the user interface adapted to render a button configured to be responsive to input representing an indication of the search requests and the queries identifying the contact for provision to the machine learning processor;
  responsive to the button, the presentation processor further configured to control updating, at the user interface, of the visual interface elements with the visual effects to indicate the contact node, the relationship edge, and the indication of the relationship score.

2. The system of claim 1 wherein the presentation server receives a query identifying a target contact corresponding to a target node within the graph structure, computes a connection pathway within the graph structure to the target node, the connection pathway including one or more edges and one or more additional nodes; and generates visual effects for the connection pathway and graph structure for display on a computing device.

3. The system of claim 2, wherein the visual effects for the connection pathway indicates an intermediate contact of an intermediate node having an edge to the target node.

4. The system of claim 1 wherein the presentation server transmits recommendations to an electronic device, the recommendations comprising multiple alternate route options based on connection paths of edges to one or more nodes representing one or more contacts identified in a query.

5. The system of claim 1 wherein the relationship score is based on a sentiment score, the natural language processing rules for sentiment classification to determine a positive sentiment, neutral sentiment and negative sentiment from text data of the electronic communication.

6. The system of claim 1 wherein the relationship score is based on a formality score, the natural language processing rules for formality classification to determine an informal tone and formal tone from text data of the electronic communication.

7. The system of claim 1 wherein the relationship score is based on a frequency score as a function of a weighted average of a frequency of electronic communication messages with reference to the contact.

8. The system of claim 1 wherein the relationship score is based on a timing score as a function of a timing data for electronic communication messages with reference to the contact.

9. The system of claim 1 wherein informal tone with good sentiment indicate a stronger relationship than formal tone with bad sentiment.

10. The system of claim 1 wherein the relationship scores is computed based on sentiment, formality, frequency and timing of the electronic communication.

11. The system of claim 1 wherein the presentation server generates the nodes by processing contact data and generates the edges by processing electronic communications referring to the contacts to compute the relationship scores between the contacts.

12. The system of claim 1, wherein the visual effects for at least a portion of the graph structure are dynamically generated in response to search requests and queries identifying the contacts to indicate the strength of connection between contacts based on the relationship score.

13. The system of claim 1, wherein the visual effects for at least a portion of the graph structure are dynamically generated based on the multiple alternate route options based on connection paths of edges to one or more nodes representing the one or more contacts identified in the queries.

14. The system of claim 1, wherein the presentation server configured to generate visual effects for the edge updated or created by the relationship score and the node corresponding to the contact.

15. A system for generating and updating user interface with machine learning output data relating to electronic communications and contact data, the system comprising a machine learning server, a presentation server, and a data storage device, the machine learning server configured to generate or update a graph structure of nodes and edges in real-time using contact data by intercepting electronic communication messages, the nodes corresponding to contacts and the edges corresponding to relationship scores computed by processing the electronic communications between the contacts using natural language processing rules for sentiment and formality classification, the relationship scores indicating strength in relationships between the contacts, the presentation server configured to process machine interpretable instructions to generate visual effects for at least a portion of the graph structure in response to search requests and queries identifying one or more of the contacts, and the data storage device storing data for the graph structure of the nodes and the edges the presentation server further configured to control rendering, on a display at a device, of a user interface including visual interface elements corresponding to the visual effects for the portion of the graph structure generated by the machine learning server, the visual interface elements indicating contact nodes and relationship edges connecting the contact nodes, the visual effects indicating contact nodes representing the nodes corresponding to the one or more of the contacts in the graph structure, relationship edges representing edges connected to the nodes corresponding to the one or more of the contacts, and indication of the relationship scores;

the user interface adapted to render a button configured to be responsive to input representing an indication of the search requests and the queries identifying the contact for provision to the machine learning server;

responsive to the button, the presentation server further configured to control updating of the visual interface elements with the visual effects to indicate the contact nodes, the relationship edges, and the indication of the relationship scores.

16. The system of claim 15, wherein the relationship scores are based on one or more of formality, sentiment, frequency, and timing of the electronic communication messages between the contacts.

17. The system of claim 15 wherein informal communications with good sentiment indicate a stronger relationship than formal communications with bad sentiment.

18. The system of claim 15 wherein the presentation server transmits recommendations to an electronic device, the recommendations comprising multiple alternate route options based on connection paths of edges to one or more nodes representing the one or more contacts identified in the queries.

19. The system of claim 15 wherein the visual effects for at least a portion of the graph structure are dynamically generated based on the multiple alternate route options based on connection paths of edges to one or more nodes representing the one or more contacts identified in the queries.

20. A process for generating and updating user interface with machine learning output data relating to electronic communications and contact data, the system comprising:
at a processor,
intercepting an electronic communication in real-time between a recipient and a sender;
classifying the electronic communication using natural language processing to determine a sentiment classification and a formality classification;
calculating a relationship score for the recipient and the sender (or other entities referred to in the electronic communication) based on the sentiment classification and the formality classification;
updating or creating in real-time an edge in a graph structure between nodes representing the recipient and the sender, the update based on the relationship score;
receiving a query identifying a target contact;
identifying a connection pathway within the graph structure to the target contact, the connection pathway including one or more edges and one or more nodes; and
generating visual effects for the connection pathway and graph structure for display on a computing device;
control rendering, on a display at a device, of a user interface including visual interface elements corresponding to the visual effects for the portion of the graph structure generated by the machine learning processor, the visual interface elements indicating contact nodes and relationship edges connecting the contact nodes, the visual effects indicating a contact node representing the node corresponding to the contact in the graph structure, a relationship edge representing the edge connected to the node corresponding to the contact, and an indication of the relationship score;

rendering at the user interface a button configured to be responsive to input representing an indication of the search requests and the queries identifying the contact for provision to the machine learning processor responsive to the button, updating, at the user interface, the visual interface elements with the visual effects to indicate the contact node, the relationship edge, and the indication of the relationship score.

* * * * *